(12) United States Patent
Berge et al.

(10) Patent No.: US 7,940,467 B2
(45) Date of Patent: May 10, 2011

(54) ELECTROWETTING DEVICE WITH POLYMER ELECTRODE

(75) Inventors: Bruno Berge, Lyons (FR); Frederic Laune, Villefontaine (FR); Julien Legrand, Lyons (FR); Mathieu Maillard, Lyons (FR); Yves-Sebastien Boulin, Tassin-la-demi-Lune (FR)

(73) Assignee: Varioptic, S.A., Lyons (FR)

( * ) Notice: Subject to any disclaimer, the term of this patent is extended or adjusted under 35 U.S.C. 154(b) by 0 days.

(21) Appl. No.: 12/666,529

(22) PCT Filed: Jun. 27, 2008

(86) PCT No.: PCT/EP2008/058263
§ 371 (c)(1),
(2), (4) Date: Dec. 23, 2009

(87) PCT Pub. No.: WO2009/003940
PCT Pub. Date: Jan. 8, 2009

(65) Prior Publication Data
US 2010/0177386 A1  Jul. 15, 2010

(30) Foreign Application Priority Data
Jun. 29, 2007 (EP) .................. 07301180

(51) Int. Cl.
*G02B 1/06* (2006.01)
*G02B 3/12* (2006.01)
(52) U.S. Cl. .................. 359/665; 359/666

(58) Field of Classification Search .......... 359/665–667
See application file for complete search history.

(56) References Cited

U.S. PATENT DOCUMENTS
5,217,649 A    6/1993  Kulkarni et al.
2003/0202256 A1  10/2003  Bao et al.
2008/0285144 A1*  11/2008  Oshima et al. ............ 359/666

FOREIGN PATENT DOCUMENTS
EP    0 497 514 A1    8/1992
EP    1 662 276 A1    5/2006
EP    1 801 622 A1    6/2007
FR    2 769 375 A1    4/1999
WO    2004/059364 A1    7/2004
WO    2006/009514 A1    1/2006

OTHER PUBLICATIONS
International Search Report w/translation from PCT/EP2008/058263 dated Sep. 29, 2008 (3 pages).

\* cited by examiner

Primary Examiner — Evelyn A. Lester
(74) Attorney, Agent, or Firm — Osha • Liang LLP

(57) ABSTRACT

The invention concerns an electrowetting optical device comprising a chamber (15) comprising first and second immiscible liquids (16, 18) contacting each other at a liquid-liquid interface (19), the first liquid being an insulating liquid and the second liquid being a conducting liquid; a first electrode (20) in the contact with the second liquid; and a second electrode (202) insulated from the first and second liquids by an insulating layer, wherein the second electrode is formed of a conductive molded polymer material, wherein the curvature of said liquid-liquid interface is controllable by application of a voltage between said first and second electrodes.

21 Claims, 5 Drawing Sheets

ELECTROWETTING DEVICE WITH POLYMER ELECTRODE

FIELD OF THE INVENTION

The present invention relates to an electrowetting device, and in particular to an electrowetting device having at least one electrode formed of a polymer material.

BACKGROUND OF THE INVENTION

Electrowetting devices, and in particular electrowetting lenses, are known in the art, and generally comprise a refractive interface between first and second immiscible liquids that is movable by electrowetting.

FIG. 1 represents FIG. 4 of European Patent Application EP 1662276, and illustrates a variable focus lens 10 according to one example of the prior art. Lens 10 comprises two transparent windows 12, 14, arranged in parallel and facing each other, and delimiting, in part, an internal volume 15 containing two immiscible liquids 16, 18, with different optical indices. Where the two liquids meet they form an optical interface 19 in the form of a meniscus, which can have a number of different shapes, examples being shown by lines A and B. The liquids 16, 18 have substantially equal densities, and one is preferably an insulating liquid, for example comprising oil and/or an oily substance, and the other is preferably a conductive liquid comprising for example an aqueous solution.

Windows 12, 14 are preferably transparent plates formed of an optical transparent material such as glass.

The structure of the lens 10 that contains the liquids comprises a cap 20 to which transparent window 12 is fixed, for example by glue 21, and a body 22 to which transparent window 14 is fixed, for example by glue 23. The cap 20 and body 22 are separated by a gasket 24. Cap 20 comprises a substantially cylindrical side wall 26, while body 22 comprises a substantially cylindrical side wall 27, and gasket 24 is positioned between the side walls 26 and 27, to ensure the tightness of the lens structure.

The cap 20 and body 22 in this example form electrodes of the lens. Cap 20 is used to provide a voltage to the conductive liquid 18. Body 22 is used to provide a voltage close to the edge of the liquid-liquid interface 19. The edge of the liquid-liquid interface 19 contacts an insulated conical surface 26 of the annular body. The parts of body 22 in contact with the liquids 16, 18, including conical surface 26, are coated with an insulating layer (not shown). The interface 19 traversed an opening in the annual body 22 through which light rays can pass.

Due to the electrowetting effect, it is possible, by applying a voltage between the cap 20 and the body 22, to change the positioning of the edge of the liquid-liquid interface on the conical surface 26, and thereby change the curvature of the refractive interface between liquids 16 and 18. For example, the interface may be changed from initial concave shape shown by dashed line A, to a convex shape as shown by solid line B. In this way, rays of light passing through the lens perpendicular to windows 12, 14 in the region of the refractive interface A, B will be focused more or less depending on the voltage applied between the cap 20 and body 22.

Body 22 is formed of a metal, machined into the shape shown in FIG. 1. For example, as body 22 is annular, it can be turned in a machine, and blades used to cut the required form. There is a general desire to make liquid lenses thinner, especially for use in some industries such as the mobile telephone industry. This has led the present applicant to design lenses having bodies of very small height, inferior to 0.5 mm. However, it has been found that for such small dimensions, machining the body is inaccurate. This inaccuracy necessitates an increase in the margins needed for certain surfaces of the body, which leads to a decrease in the zone available for contact with the liquid interface, which in turn leads to a reduced focal range of the lens.

SUMMARY OF THE INVENTION

It is an aim of embodiments of the present invention to provide a lens that at least partially overcomes one or more draw backs of the prior art.

According to one aspect of the present invention, there is provided an electrowetting optical device comprising a chamber comprising first and second immiscible liquids contacting each other at a liquid-liquid interface, the first liquid being an insulating liquid and the second liquid being a conducting liquid; a first electrode in the contact with the second liquid; and a second electrode insulated from the first and second liquids by an insulating layer, wherein the second electrode is formed of a conductive molded polymer material, wherein the curvature of said liquid-liquid interface is controllable by application of a voltage between said first and second electrodes.

According to another embodiment of the present invention, the second electrode is formed of a polymer material comprising an intrinsically conductive polymer.

According to one embodiment of the present invention, the second electrode is formed of a polymer material made conductive by the introduction of conductive particles.

According to one embodiment of the present invention, the polymer material is a thermo plastic polymer, preferably a liquid crystal polymer.

According to one embodiment of the present invention, the polymer material is a thermosetting polymer, preferably an epoxy.

According to one embodiment of the present invention, the polymer material comprises particles of carbon.

According to one embodiment of the present invention, the polymer material comprises carbon nanotubes.

According to one embodiment of the present invention, the second electrode is injection molded.

According to one embodiment of the present invention, the second electrode has a conductivity in the range of $10^4$ to $10^7$ Ohm.cm, and preferably in the range of $10^5$ to $5.10^6$ Ohm.cm.

According to one embodiment of the present invention, the electrowetting optical device comprises a plurality of contact points on said second electrode, each arranged to receive an independent voltage for controlling different parts of said liquid-liquid interface.

According to one embodiment of the present invention, the second electrode is a part of a body further comprising a molded non conductive polymer part.

According to one embodiment of the present invention, the electrowetting optical devices comprises a cap and a body separated by a gasket, wherein the second electrode forms at least a part of the body.

According to one embodiment of the present invention, the electrowetting optical device is arranged to provide one or more of the following functions upon application of one or more independent voltages variable focus; variable tilt; and variable astigmatism.

According to one embodiment of the present invention, the second electrode comprises a conical surface arranged to contact an edge of said liquid-liquid interface.

According to another aspect of the present invention, there is provided an optical apparatus comprising an image sensor for capturing an image; a lens arrangement arranged to form an image on said image sensor, the lens arrangement comprising the above optical device; and driving circuitry arranged to generate at least one voltage applied between said first and second electrodes.

According to one embodiment of the present invention, the optical apparatus further comprises a motion detector for detecting motion of said optical apparatus, wherein said optical device is arranged to shift an image formed on said image sensor in response to a motion detected by said motion detector.

According to one embodiment of the present invention, the driving circuitry is arranged to generate a first oscillating voltage of a first frequency to be applied between said first electrode and a first contact of said second electrode, and to generate a second oscillating voltage of a second frequency different to said first frequency to be applied between said first electrode and a second contact of said second electrode.

According to another aspect of the present invention, there is provided a mobile telephone comprising the above optical apparatus.

According to another aspect of the present invention, there is provided a digital camera comprising the above optical apparatus.

According to another aspect of the present invention, there is provided process for forming the above electrowetting optical device, comprising the step of forming said second electrode by molding said polymer material using a mold.

According to one embodiment of the present invention, the molding step comprises injection molding said second electrode.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

Figure 2:
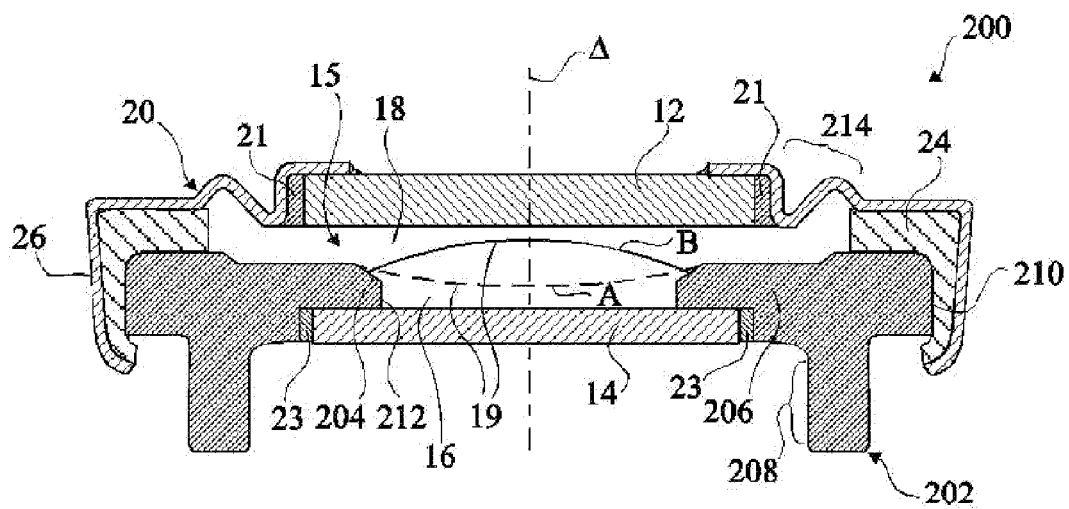
FIG. 2 is a cross-section view of a liquid lens according to a first embodiment of the present invention.

FIG. 2 is a cross-section view illustrating an example of a variable focus liquid lens 200 according to the invention. Lens 200 comprises many of the same parts as lens 10 described above, such as the transparent windows 12, 14, liquids 16, 18, cap 20, and gasket 24, and these parts will not be described again in detail. However, in lens 200, the body 22 has been replaced by a body 202.

The body 202 is molded in a conductive polymer material. The body 202 is molded to comprise a conical surface 204, which is rotationally symmetric to the optical axis Δ of the lens, and is used to center the refractive interface 19. Conical surface 204 is a bevelled surface inclined with respect to the optical axis Δ such that it forms part of a cone having its point passing through the optical axis Δ.

Body 202 further comprises a recessed region 206 for receiving window 14, and an annular foot 208, protruding from the underside of the body, which facilitates connection of the body 202 to a voltage supply. Body 202 comprises a substantially cylindrical outer surface 210 that contacts with gasket 24 to ensure tightness of the lens. At least the regions of body 202 in contact with the liquids 16, 18 are coated with an insulating layer (not shown).

The body 202 is preferably formed of a type of thermal plastic polymer, and preferably a thermal plastic polymer having a Water Vapour Transmission (WVT) of less than 0.15 g.mm/m$^2$.day (measured as per DIN 53122 part 2) so that it is sufficiently hermetic for the purposes of containing the liquids 16, 18 in the internal volume 15 of the lens. More preferably, the WVT coefficient of the body 202 is less than 0.02 g.mm/m$^2$.day.

The applicant has shown that LCP (Liquid Crystal Polymer) is good material in terms of its WVT coefficient, and therefore the body preferably comprises an LCP, such as for example Ticona Vectra A725.

The applicant has shown that thermosetting polymers, for example epoxy, can also be used to form the body 202. They present good mechanical properties and have good chemical resistance and appropriate low WVT coefficients.

One of the roles of the body 202 is to form an electrode of the lens, allowing a voltage to be provided to a region close to the conical surface 204. Therefore, the polymer material of the body 202 can be made of an intrinsically conductive polymer (ICP). The term ICP refers to organic polymers which have (poly)-conjugated π-electron systems (e.g. double bonds, aromatic or heteroaromatic rings or triple bonds). Examples of such polymers are polydiacetylene, polyacetylene, (PAc), polypyrrole (PPy), polyaniline (PANI), polythiophene (PTh), polyisothionaphtalene (PITN), polyheteroarylenvynilene (PArV), in which the heteroarylene group can be the thiophene, furan, or pyrrole, poly-p-phenylene (PpP), polyphthalocyanine (PPhc), and the like, and their derivatives (formed for example from monomers substituted with side chains or group), their copolymer and their mixtures. Advantageously, blends of intrinsically conductive polymers with conventional processable thermoplastics can be used. An example of such a blends is described in the United States patent of Kulkarni et al. U.S. Pat. No. 5,217,649, which is hereby incorporated by reference to the extend allowable by the law. This patent describes making conductive polymeric blends by mixing "doped" polyaniline and polyvinyl chloride, chlorinated polyethylene or other thermoplastic polymers, which exhibit high electrical conductivity. The blend comprises an intrinsically conductive polymer, an insulating thermoplastic material and at least one additive selected from the group consisting of an impact modifier, an ester-free plasticizer and an acidic surfactant.

Some polymers such as LCPs or epoxy are not intrinsically conductive, but can be made conductive by mixing or implanting conductive particles or fibres into the polymer, to form a composite conductive polymer to form the body 202. By using fibres, such as carbon fibres, carbon nanotubes or fine metal wire, a mechanically strong composite can be formed, which is particular advantageous for forming bodies which are to be subject to mechanical stress, for example bodies to which a cap is crimped. A variant could be to use metal coated fibres, for example silver on glass.

The use of particles mixed with the polymer to provide a conductive material is preferable in some cases as this can improve hermetic properties of the body 202. According to one example, a polymer with a carbon black additive could be used, produced by incomplete combustion of hydrocarbon vapours. Such a material includes polyethylene with black composite. Alternatively, for a better control of the conductivity of the body 202, a polymer mixed with metal particles, such as nickel or silver, could be used. Alternatively again, a polymer can be doped with conductive particles. An example is to use metallic organic charge transfer salts which have common solvents with the polymer host. Such a material is termed a reticulate doped polymer.

Injection molding is preferably used to form the body 202. Injection mounding allows the surface of a mold to be copied many times. Thus the mold, which is for example used for producing thousands of polymer bodies 202, can for example be machined in metal at high cost to ensure that it is very accurate. Furthermore, surfaces of the mold, such as the surface that forms the conical surface 204 of the polymer body 202, which determines the optical quality of the lens, are preferably polished, to improve surface roughness. Other molding techniques like replication can be used when body 202 is formed of a thermosetting polymer like epoxy.

Cap 20 comprises a number of undulations 214 on an upper surface between an opening provided for window 12 and the side portions 24. Undulations 214 are rotationally symmetrical to the optical axis, and allow some movement of the window 12 in a direction perpendicular to the optical axis Δ, in response to expansion or contraction of the liquids 16, 18 in the lens.

An electrical insulating layer (not shown in FIG. 2) is provided covering at least parts of the body 202 exposed to the liquids 16 and 18. Advantageously this can be formed of a fluorinated parylene, for example Parylene C, Parylene N, Parylene D, Parylene AF-4, Parylene F (marketed as Parylene HT or Parylene Dix F), Parylene VT-4, or other kinds of fluorinated Parylene. Preferably, Parylene C or Parylene F is used. Alternatively, it could be a stacking of the above Parylene type polymers, such as Parylene C with Parylene D or Parylene AF-4 or Parylene F or Parylene VT-4, or an alternative combination of different Parylenes chosen as a function of the particular liquids 16 and 18 of the lens. The insulating layer for example has a thickness of between 50 nm and 100 microns, with a typical value between 1 and 10 microns, depending on characteristics of the lens, such as the voltages to be applied, etc. The coating may be applied by chemical vapour deposition, for example vapour deposition polymerization, resulting in a uniform layer. Materials formed of Parylene show good dielectric properties and advantageously have low absorption of the liquids, providing a protective coating to the body 202, and also a relatively high coefficient of thermal expansion, leading to good dielectric reliability of the coating upon a change in temperature of the body 202. In particular, given that parylene is a plastic (with a high CTE), allows the dielectric to follow the thermal expansion of the substrate when the system is under thermal stress, which means a reliable dielectric layer. An alternative coating could comprise a thin electrically insulating inorganic layer, for example with a thickness between 50 nm and 1000 nm in thickness, with for example a hydrophobic layer formed over it with a thickness between a few nanometers and 100 nanometers.

In some embodiments, a single voltage is applied to body 202, which is sufficiently conductive that the voltage is relatively evenly dispersed to all regions of the body 202, and in particular close to the conical surface 204. Alternatively, a resistive body 202 can be provided, as will now be described.

Figure 3A:
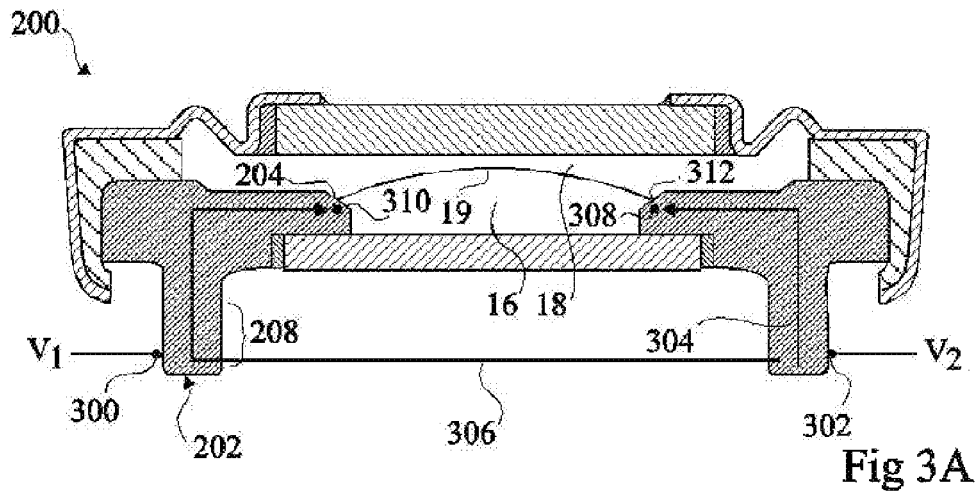
FIG. 3A is a cross-section view of a liquid lens according to another embodiment of the present invention.

FIG. 3A is a cross-section view of lens 200, used to illustrate an example in which a plurality of voltages are applied to the body 202. This allows the liquid interface 19 to be controlled to provide tilt or astigmatism.

In this example, body 202 is formed of a partially conductive material, for example having a homogeneous conductivity in the range of $10^4$ and $10^7$ Ohm.cm, and preferably in the range $10^5$ to $5.10^6$ Ohm.cm, and more preferably equal to approximately $5.10^5$ Ohm.cm. The result is that when a plurality of different voltages are applied to different points around the body 202, the displacement of the edge of the liquid interface 19 at different regions around the lens can be controlled independently to some extent.

FIG. 3A shows the example in which a voltage V1 is applied on one side of the annular foot 208 of body 202 at point 300, while a second voltage V2 is applied to an opposite side of the annular foot 208 at a point 302. The voltages are for example each AC voltages in the range 0 V to 120 V RMS. The voltages can for example be applied by the tip of a wire, for example glued to the body 202 at a single point, or the connection could be spread over a larger area by an intermediate conductor, for example glued, deposited by a vapour deposition process, or pushed against the body by force. In one embodiment each electrical contact could be spread as a thin layer close to the vicinity of the liquid interface, preferably having an edge closest to the conical surface 204 at a relatively uniform distance from the top and bottom edges of the conical surface 204 to provide a relatively homogeneous electric field from top to bottom of the conical surface.

It will be apparent that the body 202 may be provided to be rotationally symmetrical, and connections could be made with the body for providing different voltages only at a time when the lens is placed in a holder. Alternatively, a number of contact protrusions could be formed extending from the annular foot 208 where contacts are to be made, which is for example possible because the electrode is molded rather than machined.

The applied voltages V1, V2 generate potential gradients in the body 202, the gradient depending on the conductivity of the body 202. Thus the effective voltage in the body 202 at a given position close to the conical surface 204 will depend on the magnitude of voltages V1 or V2, and also the distance from the given position to points 300, 302. The effective voltage (Vc), applied to regions 308 and 310, which provides the movement of the edge of interface 19 by electrowetting and thus also the change in the contact angle between interface 212 and surface 224, can be approximated based on the Millman equation for an RC circuit connected to ground as follows:

$$Vc = V/\sqrt{(1+Rs^2\omega^2Cs^2)} = V/\sqrt{(1+d^2\sigma^2\omega^2Cs^2)}$$

where V is the voltage V1 or V2 applied between electrode 300 or 302 and cap 20, d is the distance from electrode 300 or 302 to the interface contact portion 204, ω is equal to 2πf, where f is the frequency of voltage V, Cs is the capacitance per unit area of the insulating layer covering the conical surface 204, Rs is the resistance per unit area between the electrode 300 or 302 and conical surface 204, and σ is the resistivity of the material of the body 202. While the effective voltage Vc is a complex function of the electrical contact position and the 3-dimensional shape of the body 202, it can be approximated taking into account the distance d and resistivity σ of the conductive polymer body 202. From this formula it can be shown that the higher the resistivity of the polymer body 202, the faster the voltage Vc falls in relation to the distance d from electrode 300 or 302.

As shown by arrows 304 and 306, the distance from the point 302 at which voltage V2 is applied is relatively close to a position 308 in the body 202 close to the conical surface 204 on the same side of the lens, but relatively far from a position 310 in the body 202 close to conical surface 204 on the other side of the lens. Although not shown in FIG. 3A, the path indicated by arrow 306 in fact comprises two branches passing around the annular foot 208 on each side of the lens. The electrodes 300, 302 are preferably positioned and the resistivity σ of the body 202 preferably chosen such that a large proportion of voltage V2 applied to electrode 302 is present at the edge 312 of the liquid interface 19 at position 308, whereas a relatively small proportion of voltage V1 is present at the edge of interface 19 at position 310. Thus voltage V2 has a greater effect on the liquid interface 19 close to position 308 than on the liquid interface 19 close to position 310, whereas the contrary applies to voltage V1. When a plurality of voltages are applied to the body 202, an electrical current will pass through the body. The current is inversely proportional to the resistivity of the body 202, as described by Ohm's law I=ΔV/R. For this reason, increased resistivity leads to a reduction in current, and therefore a reduction in the power consumption of the device. On the other hand, if the resistivity is too large, the voltage attenuation in the body can be too great, leading to isolated potentials in the body 202, which could result in distortion of the liquid interface 19. Therefore, a trade-off is preferably made between achieving a low power consumption of the lens and a relatively even potential gradient in the body 202.

Figure 3B:
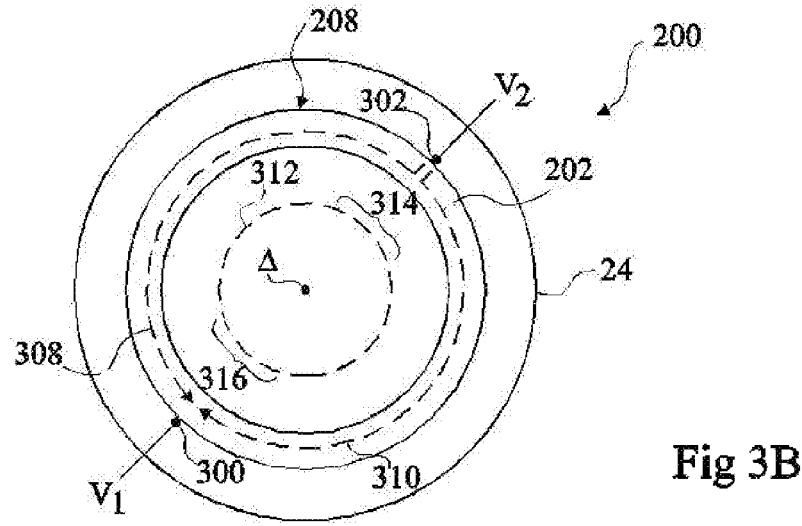
FIG. 3B is a plan view of the liquid lens of FIG. 3A.

FIG. 3B is a plan view showing the underside of lens 200, and shows an example of the positioning of points 300, 302 where the voltages V1 and V2 can be applied. In this example, the points are at exactly opposite points across the lens, in line with the optical axis Δ. If V2 is a higher voltage than V1, a current will flow shown by dashed lines 308 and 310 from the voltage source V2 through the body 202 from voltage source V2 to voltage source V1. Dashed line 312 illustrates the positioning of the edge of liquid interface with respect to the annular foot 208. As illustrated, voltage V2 will have more effect on the liquid interface 19 in a region 314 closest to the voltage source V2, while the voltage V1 will have more effect on the liquid interface 19 in a region 316 closest to source V1. In this way, by applying different voltages V1 and V2, the liquid liquid interface can be controlled differently on different sides of the lens.

Figure 3C:
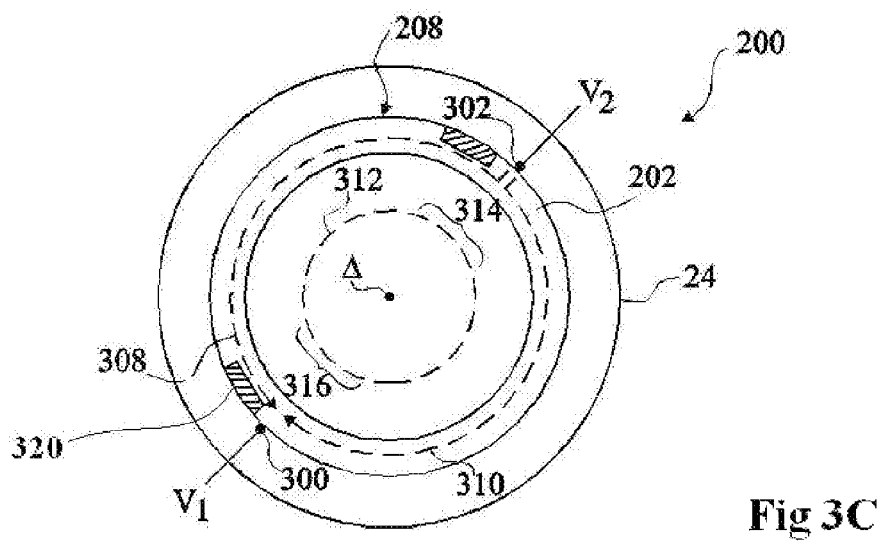
FIG. 3C is a plan view of the liquid lens of FIG. 3A according to a further embodiment.

FIG. 3C is a plan view similar to FIG. 3B, corresponding to the underside of lens 200, and showing a further embodiment of the lens 200. In this example, the annular foot 208 of the body 202 further comprises two recessed regions 320 that play a role of keys to provide an accurate positioning of the lens 200, when integrated in an optical system, for example a camera module. Keys 320 also allow to correctly position the electrical contact points 300 and 302 on the body 202. This enables to get a more reproducible performance of the lens 200, for example in the case the conductivity of the body 202 is not perfectly homogeneous, due to its manufacturing. This can happen when the conductive polymer body is injection molded using for example a single gate, as injection molding has poor radial symmetry.

Figure 4:
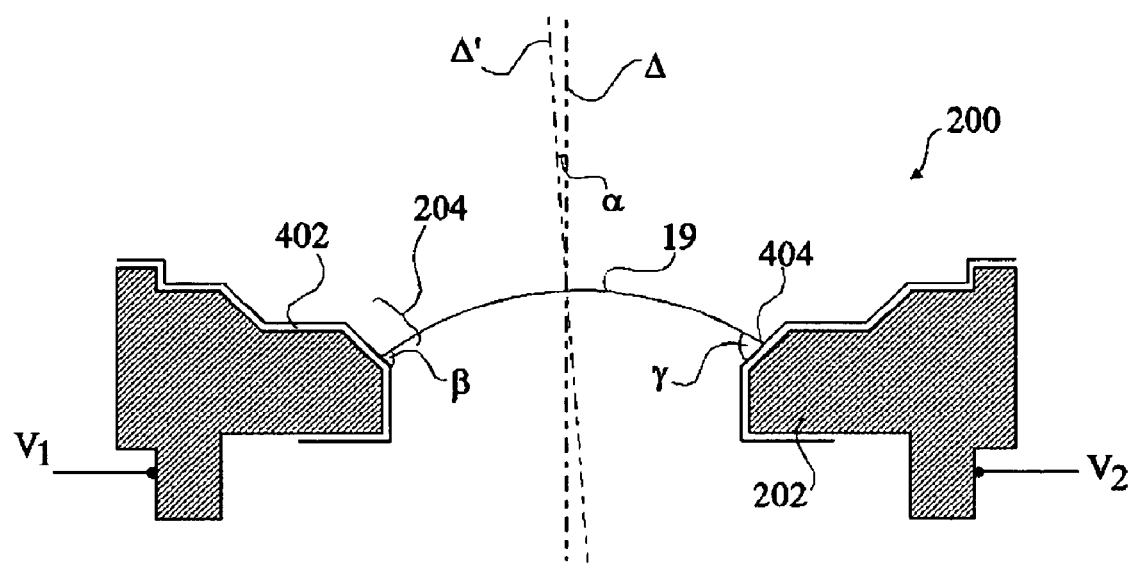
FIG. 4 is a cross-section view schematically illustrating the effect of tilt in embodiments of the present invention.

FIG. 4 is a cross-section view schematically illustrating part of liquid lens 200, and showing how a tilt can be achieved by application of different voltages V1 and V2. The insulating layer covering the body portion 202 is shown labelled 402. The example is shown in which voltage V1 applied to the left-hand side of the body 202 is higher than voltage V2 applied to the right-hand side of the body. As illustrated, due to the electrowetting effect, the higher voltage provided to the left-hand side causes a large displacement of the edge 404 of the liquid interface 19 on the left hand side of the lens than the displacement of edge 404 on the right-hand side. This results in the refractive interface 19 being titled, such that whereas the normal optical axis Δ of refractive interface 19 extends through a central axis of the lens, perpendicular to windows 12, 14, the new optical axis Δ' of the titled refractive interface is inclined by an angle α to the normal optical axis L.

Angle α is for example controllable in a range from 0-30° by the difference between V1 and V2. Angle α for a given cross-section of the lens can be determined approximately as half the difference in contact angle between the edge 404 of the refractive interface 19 with conical surface 204 at each side of the lens. Assuming a contact angle β between edge 402 and surface 204 in the region of voltage V1, and a contact angle γ between edge 402 and surface 204 in the region of voltage V2, angle α can be determined as approximately equal to (β−γ)/2. This represents the geometric tilt of a refractive interface. The effective optical tilt can be approximately determined as:

Optical Tilt=Geometric Tilt·Δn where Δn is the refractive index of insulating liquid 16 minus that of conducting liquid 18.

According to some embodiments, the angle of tilt is controllable at the same time as the power of the lens, in other words the extent of curvature of the refractive surface 406. The power of the lens is determined based on the average of voltages V1 and V2, where as the tilt is determined according to the difference between V1 and V2.

The inventors have found that the frequency f of voltages V1 and V2 also has an influence on the effective voltage at surface 204. In particular, the higher the frequency f, the faster the effective voltage drops in the resistive body with distance from voltage sources V1 and V2. In the above example of the operation, V1 and V2 both for example have frequencies of approximately 1 kHz. However, in alternative examples, the frequency of one of the voltages is for example approximately 20 kHz, thus decreasing the effect of a voltage applied to this electrode. This can allow the power and tilt to be controlled individually by applying V1 at a first frequency, and V2 at a second frequency. The voltages applied between the body electrode and the cap electrode in the embodiments described herein preferably have frequencies in the range 500 Hz to 200 kHz. For example, a voltage at a low frequency can be used to control power, while a second voltage at a higher frequency can be used to control tilt.

Figure 5A:
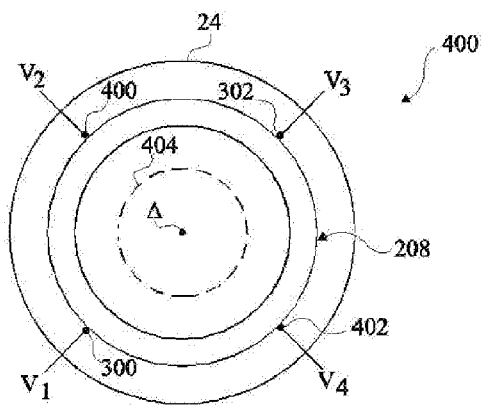
FIGS. 5A and 5B are plan views illustrating a liquid lens according to further embodiments of the present invention.
Figure 5B:
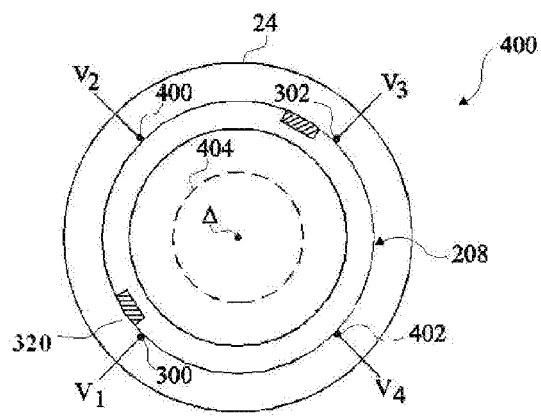

FIGS. 5A and 5B are views of the underside of a further embodiment which is similar to the embodiment of FIGS. 3B and 3C, except that there are now four separate voltages applied to the annular foot 208 of the body 202. Voltages V1, V2, V3 and V4 are applied at evenly spaced intervals around the circumference of the annular foot, at approximately 90 degree separations. By providing four points of contact, and four independent voltages, the refractive interface may be controlled in more complex ways. In particular, by applying a higher voltage at two adjacent points, the interface can be tilted, while astigmatism can be provided by applying higher voltages at opposite sides. Again, the frequency of the voltages can be varied to vary their effect.

It will be apparent that the idea of providing multiple electrodes to give variable tilt or astigmatism to the optical interface can be extended to any number of contact points with the body. Increasing the number of contact points allow a more complex control of the liquid interface.

Figure 6:
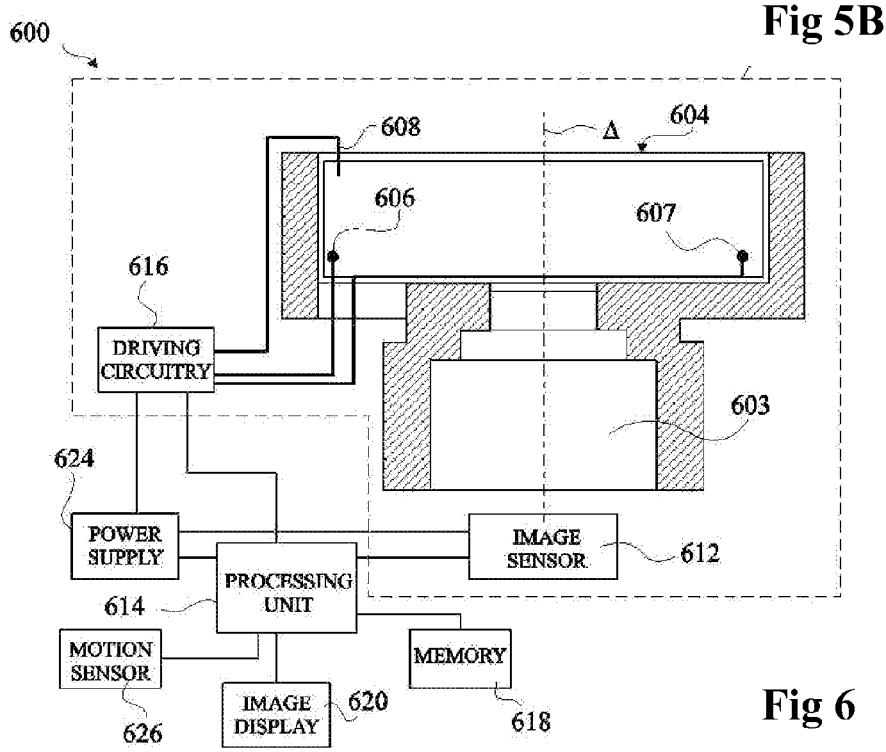
FIG. 6 is a schematic illustration of an optical apparatus according to an embodiment of the present invention.

FIG. 6 is a schematic view of an optical apparatus 600 including an optical device according to embodiments of the invention, which is for example to be used in a compact digital camera, mobile phone, or alternative electronic device. Optical apparatus 600 comprises a camera module 602 comprising a lens arrangement 603 and an optical device 604 according to one of the embodiments described herein. Optical device 604 has at least two separate contacts 606 and 607 for connecting voltages to a body of the lens (not shown), although, any number of contacts could be provided. At least one further electrode 608 is provided for making contact with the conducting liquid in the lens. The lens arrangement 603 comprises a number of fixed lenses.

Driving circuitry 616 is provided connected to the contacts 606, 607 and electrode 608. The driving circuitry 616 generates oscillating voltage signals to each of the electrodes.

The driving circuitry 616 for example comprises one or more frequency oscillators for generating signals at one or more given frequencies. These signals can then be amplified before being provided between contacts 606 and/or 607 and electrode 608.

According to some embodiments, the voltages applied between electrode 608 and the body electrode contacts 606, 607 have different voltage levels or RMS values. This can for example be achieved by providing a variable resistor connected in series between the voltage signal and each of the contacts on the electrodes, so that the peak to peak voltage level can be varied independently.

Alternatively, identical voltage signals having the same peak to peak voltage value, the same period and the same RMS voltage can be applied to the electrodes at the same time, but a variable delay can be added to the signal applied to each of the contacts 606, 607. In this way, the RMS voltage can be varied anywhere between 0V, when the signals applied to electrode 608 and one of the contacts 606, 607 are exactly in phase, and a maximum value when the voltage signals are exactly 180 degrees out of phase. Such delays can for example be provided by capacitors.

As a further alternative, the RMS voltage of the signal to each of the contacts 606, 607 can be varied by varying the duty cycle of each of these signals, while providing either 0V or a signal having a constant duty circle to the electrode 608.

In an alternative embodiment, each of the contacts 606, 607 is supplied in turn with an AC voltage signal. The time during which the voltage signal is applied is varied for each contact so that the required voltage is applied. The time period during which the contact 606, 607 are not connected to the AC voltage signal is preferably shorter than the response time of a liquid interface so that there is no undesired movement of interface. As an alternative, the signal frequency can be increased or decreased, for example by applying only selected pulses of the referenced oscillating signal, resulting in a varied RMS voltage output.

The camera module 602 further comprises an image sensor 612 which captures images formed from light rays received by optical device 604 and fixed lenses 603.

A processing unit 614 is provided in the optical apparatus 600, which is for example an image signal processor or a base band processor of a mobile phone. Processing unit 614 implements algorithms for controlling the driving circuitry 616, and also controls image sensor 612 to capture images. Processing unit 614 receives captured images from image sensor 612 and stores them in a memory 618 and/or displays them on a display 620.

A power supply unit 624 provides supply voltages to the driving circuitry 616, the image sensor 612 and the processing unit 614

In some embodiments, the optical device 604 is a lens able to perform variable tilt, and such a function can be used to compensate for any movement of the optical apparatus 600 as an image is captured, which can cause blurring. In order to detect any movement of the apparatus, a motion sensor 626 can be provided in some embodiments, connected to the processing unit 614, or directly to the driving circuitry 616. Motion sensor 626 detects any motion, and generates an output signal to control the extent of tilt of a refractive interface of the optical device 604 in response. Motion sensor 626 can comprise any suitable means for detecting motion of the apparatus, such as a micro-electro-mechanical system (MEM) accelerometer. Alternatively, motion can be detected by detecting movement of the images sensed by the image sensor.

The optical device 604 is orientated in the camera module 602 thanks to positioning features (not shown), such as keys formed on the annular foot of the optical device body for example described in FIG. 3C. These features allow electrical contacts to be always positioned in the same manner relatively to the motion sensor. Preferably, a calibration loop is provided to calibrate the tilt before a picture is taken. In particular, while an image is being previewed, and before a final image is taken, motion can be detected for example using the motion sensor 626, the image can be tilted in response to account for the motion, and the image from the image sensor can be used to determine if the correct tilt was applied based on the motion. In particular, if too much or too little tilt was provided, this information can be used to recalibrate the tilt applied for a given movement for future movements. Calibration can be repeated several times such that when a picture is taken, the motion detection is calibrated.

Figure 7:
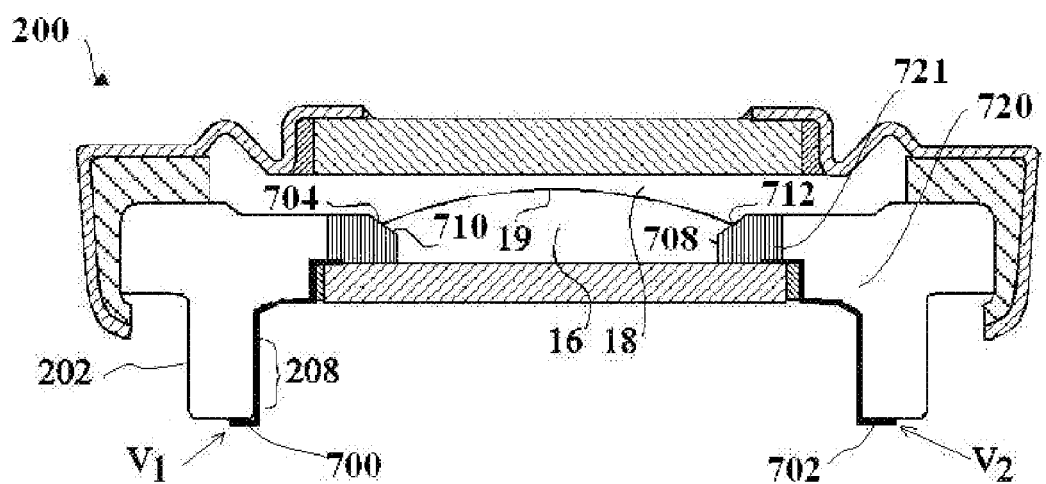
FIG. 7 is a cross-section view of a liquid lens according to another embodiment of the present invention.

FIG. 7 is a cross-section view of a further embodiment of an electrowetting optical device according to the invention, which can also be integrated in an optical apparatus as described in reference to FIG. 6. The embodiment of FIG. 7 is similar to the embodiment of FIG. 3A, except that the body 202 is now formed of two parts 720 and 721. Part 721 of the body 202 is formed of a conductive molded polymer material, for example one of those previously described, and plays the role of the second electrode. Part 720 is formed of a non conductive polymer, for example a non charged thermo plastic polymers like LCP or non charged thermosetting polymers like epoxy. Part 721 is annular and corresponds to the upper conical part of the body in contact with the liquid-liquid interface. Parts 720 and 721 are molded, preferably injection molded, and are for example glued to form a single body piece 202. Part 721 can be notched in order to be solidly fixed to part 720. FIG. 7 shows an example in which two different voltages V1 and V2 are applied, through two electrical contact points 700 and 702. These contact points are for example thin metal layers, or layers of other conductive material, spread over the underside of the body, from the base of the annular foot 208 to the underside part of the conductive part 721.

One advantage of this embodiment is to provide the applied voltages V1 and V2 very close to the conical surface 604, so that the effective voltage is similar to the applied voltage. This allows reducing possible electrical loss across the conductive body, and thus enables to reduce the power consumption of the lens, and to better control the liquid-liquid interface deformation.

Thus an electrowetting optical device has been described in which a body, which forms one electrode of the device, is formed of a conductive molded polymer material. The body for example has a height of less than 0.5 mm.

Figure 1:
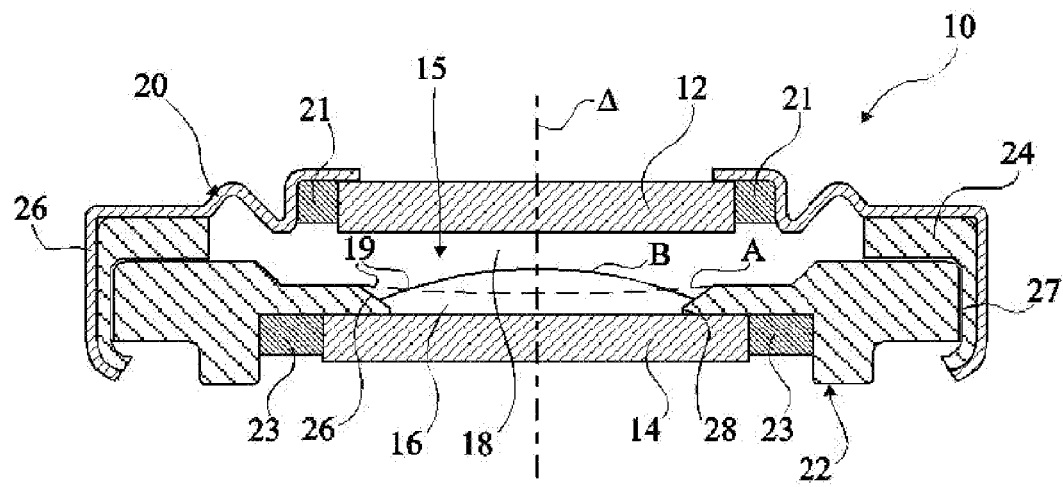
FIG. 1 (described above) is a cross-section view of a liquid lens according to the prior art.

Advantageously, by molding the body, or part of the body, the accuracy of the surfaces may be improved, and in particular, the accuracy of the conical surface, labelled 204 in FIGS. 2 and 704 in FIG. 7, that receives the liquid interface 19 can be improved. As an example, it has been found that a machined body 22 of FIG. 1 has a typical tolerance in the height of the conical surface 26 of roughly +/−0.04 mm and in the diameter of the conical surface of roughly +/−0.02 mm, leading to a possible error in the focus of the refractive interface 19 at 0V of +/−4 to 6 diopters. By contrast, it has been found that an injection molded body 202 can have a tolerance of only approximately +/−0.008 mm in the height and diameter of the conical surface, giving a possible error of only +/−1 to 2 diopters at 0 V.

It has been found that molding such a body in metal is relatively costly and also results in inferior quality and accuracy when compared to molding in plastic. However, by molding the body from a polymer material, greater accuracy and a lower cost can be achieved.

It will be apparent to those skilled in the art that a molded piece can be distinguished from a machined part. For example, it is apparent from features left in the piece at the join between two halves of the mold, or in the case of injection molded pieces, in a feature remaining where the polymer material is injected.

An advantage of the improved precision of the conical surface of the body is that the focus of the lens is more accurate when no voltage is applied to the electrodes, meaning that the lens can be operational, for example focused at infinity, even when driving circuitry is disconnected or malfunctioning.

Advantageously, by providing a conductive polymer body, a smooth contact surface in contact with the liquid interface can be achieved, reducing the hysteresis and the wave front error of the lens. The conductive polymer has advantages over alternative solutions such as providing a metal coating on the polymer. Such a metal coating can lead to an inferior surface quality of the conical surface as a relatively rough surface of the polymer material is generally required to allow metal to be coated on it.

A further advantage of a polymer body 202 is that it is lighter than a metal body, which is desirable in many applications, in particular compact mobile devices such as mobile telephones and digital cameras.

Advantageously, by forming the body 202 from a polymer the device is also more resistant to mechanical shocks.

Advantageously, by molding the body, not only is the conical surface formed with improved precision, but a cylindrical portion 212 shown in FIG. 2 between the conical surface 204 and window 14 is also more accurately formed, and in particular, has a precise height. This is important in the liquid lens as when a determined quantity of insulating liquid 16 is inserted into the lens, the height of cylindrical surface 212 determines the level that the liquid interface 19 will reach on the conical surface 204, and thus the positioning and shape of the interface.

Furthermore, when very thin lenses are to be produced, for example having bodies having a height of 0.5 mm or less, the conical surface with which the edge of the liquid interface 19 contacts can be very limited in size if a machining process of reasonable cost is used. This is due to the error margins that must be allowed for surfaces of the body when machining, which mean for example that surfaces such as cylindrical surface 212 in FIG. 2 must have at least a minimum height in order to be capable of being formed by machining. Such a minimum height can be a large percentage of the overall height of the body if the body is very thin, thereby reducing the height of the conical surface, and thus reducing the range of possible movement of the liquid interface 19 and also the variability of the lens. By contrast, when molding is used, error margins are reduced, and parts such as the cylindrical surface 212 can be made much smaller, allowing a larger height of the conical surface 204.

Advantageously, when the body 202, or part of the body 721, is formed by molding, no polishing step of the body is needed after molding, especially when using Ultra precision machine tools and appropriated techniques, for example Diamond turning technology, for low roughness mold making. On the other hand, if a metal body is formed by machining, a polishing step is often needed to remove unwanted residues. This results in a radius at certain corners of the body, in other words a curving of the sharp edges, such as at the top and bottom edges of the conical surface, which reducing the accurate focusing range of the lens. Thus molding the body can improve the focal range of the lens.

Having thus described at least one illustrative embodiment of the invention, various alterations, modifications and improvements will readily occur to those skilled in the art.

For example, while embodiments have been described with 2 and 4 contacts with the body electrode for providing different voltages, any number of contacts could be provided, depending on the required control of liquid interface. The contacts are preferably evenly spaced around the body, at equal distances from the conical surface 204.

Furthermore, while a conical surface 204 has been described for providing a support and centering means for the edge of the liquid interface 19, in alternative embodiments, different shaped surfaces could be provided.

While planar windows 12, 14 are shown in the figures, these windows could be replaced by fixed lenses, centred on the optical axis Δ of the lens, and they may be fixed to the cap 20 and body 22 by glue, or other means such as by heat welding. Furthermore, either window could be replaced by a mirrored surface facing into the lens such that the lens acts as a mirror having variable optical characteristics.

The electrowetting device according to the embodiments described herein could be incorporated in any optical system, for example in cameras, mobile telephones, ophthalmic tools, endoscopes, barcode readers, binoculars etc.

The invention claimed is:

1. An electrowetting optical device comprising:
  a chamber comprising a first immiscible liquid and a second immiscible liquid contacting each other at a liquid-liquid interface, wherein the first immiscible liquid is an insulating liquid and the second immiscible liquid is a conducting liquid;
  a first electrode in contact with the second immiscible liquid; and
  a second electrode insulated from the first immiscible liquid and the second immiscible liquid by an insulating layer, wherein the second electrode is formed of a conductive molded polymer material, wherein curvature of the liquid-liquid interface is controllable by application of a voltage between the first electrode and the second electrode, and wherein the conductive molded polymer material has a Water Vapour Transmission below 0.15 g.mm/m$^2$.day.

2. The electrowetting optical device of claim 1, wherein the second electrode is formed of a copolymer material comprising an intrinsically conductive polymer.

3. The electrowetting optical device of claim 1, wherein the conductive molded polymer material is made conductive by an introduction of conductive particles.

4. The electrowetting optical device of claim 3, wherein the conductive molded polymer material is a thermo plastic polymer.

5. The electrowetting optical device of claim 1, wherein the conductive molded polymer material is a thermosetting polymer.

6. The electrowetting optical device of claim 3, wherein the conductive molded polymer material comprises particles of carbon.

7. The electrowetting optical device of claim 6, wherein the conductive molded polymer material comprises carbon nanotubes.

8. The electrowetting optical device of claim 1, wherein the second electrode is injection molded.

9. The electrowetting optical device of claim 1, wherein the second electrode has a conductivity in the range of $10^4$ to $10^7$ Ohm.cm.

10. The electrowetting optical device of claim 1, wherein the second electrode comprises a plurality of contact points, wherein each of the plurality of contact points is configured to receive an independent voltage for controlling different parts of the liquid-liquid interface.

11. The electrowetting optical device of claim 1, wherein a body comprises the second electrode and a molded non-conductive polymer part.

12. The electrowetting optical device of claim 1, comprising a cap and a body separated by a gasket, wherein the second electrode forms at least a part of the body.

13. The electrowetting optical device of claim 1, arranged to provide, upon application of at least one independent voltage, at least one function selected from a group consisting of variable focus, variable tilt, and variable astigmatism.

14. The electrowetting optical device of claim 1, wherein the second electrode comprises a conical surface arranged to contact an edge of the liquid-liquid interface.

15. An optical apparatus comprising:
an image sensor for capturing an image;
a lens arrangement arranged to form the image on the image sensor, wherein the lens arrangement comprising an optical device, wherein the optical device comprises:
a chamber comprising a first immiscible liquid and a second immiscible liquid contacting each other at a liquid-liquid interface, wherein the first immiscible liquid is an insulating liquid and the second immiscible liquid is a conducting liquid;
a first electrode in contact with the second immiscible liquid; and
a second electrode insulated from the first immiscible liquid and the second immiscible liquid by an insulating layer, wherein the second electrode is formed of a conductive molded polymer material, wherein curvature of the liquid-liquid interface is controllable by application of a voltage between the first electrode and the second electrode, and wherein the conductive molded polymer material has a Water Vapour Transmission below 0.15 g.mm/m².day; and
driving circuitry configured to generate at least one voltage applied between the first electrode and the second electrode.

16. The optical apparatus of claim 15, further comprising:
a motion detector for detecting motion of the optical apparatus, wherein the optical device is arranged to shift the image formed on the image sensor in response to a motion detected by the motion detector.

17. The optical apparatus of claim 15, wherein the driving circuitry is configured to:
generate a first oscillating voltage of a first frequency, wherein the first frequency is applied between the first electrode and a first contact of the second electrode, and
generate a second oscillating voltage of a second frequency, wherein the second frequency is different than the first frequency, and wherein the second frequency is applied between the first electrode and a second contact of the second electrode.

18. A mobile telephone comprising an optical apparatus, the optical apparatus comprising:
an image sensor for capturing an image;
a lens arrangement arranged to form the image on the image sensor, wherein the lens arrangement comprising an optical device, wherein the optical device comprises:
a chamber comprising a first immiscible liquid and a second immiscible liquid contacting each other at a liquid-liquid interface, wherein the first immiscible liquid is an insulating liquid and the second immiscible liquid is a conducting liquid;
a first electrode in contact with the second immiscible liquid; and
a second electrode insulated from the first immiscible liquid and the second immiscible liquid by an insulating layer, wherein the second electrode is formed of a conductive molded polymer material, wherein curvature of the liquid-liquid interface is controllable by application of a voltage between the first electrode and the second electrode, and wherein the conductive molded polymer material has a Water Vapour Transmission below 0.15 g.mm/m².day; and
driving circuitry arranged to generate at least one voltage applied between the first electrode and the second electrode.

19. A digital camera comprising the optical apparatus, the optical apparatus comprising:
an image sensor for capturing an image;
a lens arrangement arranged to form the image on the image sensor, wherein the lens arrangement comprising an optical device, wherein the optical device comprises:
a chamber comprising a first immiscible liquid and a second immiscible liquid contacting each other at a liquid-liquid interface, wherein the first immiscible liquid is an insulating liquid and the second immiscible liquid is a conducting liquid;
a first electrode in contact with the second immiscible liquid; and
a second electrode insulated from the first immiscible liquid and the second immiscible liquid by an insulating layer, wherein the second electrode is formed of a conductive molded polymer material, wherein curvature of the liquid-liquid interface is controllable by application of a voltage between the first electrode and the second electrode, and wherein the conductive molded polymer material has a Water Vapour Transmission below 0.15 g.mm/m².day; and
driving circuitry arranged to generate at least one voltage applied between the first electrode and the second electrode.

20. A process for forming the electrowetting optical device comprising:
forming a second electrode by molding the polymer material using a mold, wherein the electrowetting optical device comprises:
a chamber comprising a first immiscible liquid and a second immiscible liquid contacting each other at a liquid-liquid interface, wherein the first immiscible liquid is an insulating liquid and the second immiscible liquid is a conducting liquid;
a first electrode in contact with the second immiscible liquid; and
a second electrode insulated from the first immiscible liquid and the second immiscible liquid by an insulating layer, wherein the second electrode is formed of a conductive molded polymer material, wherein curvature of the liquid-liquid interface is, controllable by application of a voltage between the first electrode and the second electrode, and wherein the conductive molded polymer material has a Water Vapour Transmission below 0.15 g.mm/m$^2$.day.

21. The process of claim 20, wherein forming the second electrode by molding the conductive molded polymer material comprises injection molding the second electrode.

* * * * *